United States Patent [19]
Frosch et al.

[11] 4,088,312
[45] May 9, 1978

[54] VARIABLE CONTOUR SECURING SYSTEM

[76] Inventors: Robert A. Frosch, Administrator of the National Aeronautics and Space Administration, with respect to an invention of; Paul P. Zebus, Lakewood, Calif.; Poley N. Packer, Long Beach, Calif.; Cyrus C. Haynie, Newport Beach, Calif.

[21] Appl. No.: 837,260
[22] Filed: Sep. 27, 1977
[51] Int. Cl.² ............................................. B25B 11/00
[52] U.S. Cl. ...................................... 269/21; 269/266
[58] Field of Search ................................... 269/21, 266

[56] References Cited
U.S. PATENT DOCUMENTS

| | | |
|---|---|---|
| 2,858,597 | 11/1958 | Kraemer ................................ 269/21 |
| 2,976,037 | 3/1961 | Seel et al. ............................... 269/21 |
| 3,530,994 | 9/1970 | Bourassa et al. ...................... 269/266 |

*Primary Examiner*—Robert C. Watson
*Attorney, Agent, or Firm*—Marvin J. Marnock; John R. Manning; Marvin F. Matthews

[57] ABSTRACT

A variable contour securing system has a retaining structure for a member whose surface contains a variable contour. The retaining mechanism includes a spaced array of adjustable spindles mounted on a housing. Each spindle has a base member support cup at one end thereof. A vacuum source is applied to the cups for seating the member adjacent to the cups. A locking mechanism sets the spindles in a predetermined position once the member has been secured to the spindle support cups.

7 Claims, 7 Drawing Figures

VARIABLE CONTOUR SECURING SYSTEM

ORIGIN OF THE INVENTION

The invention described herein was made in the performance of work under a NASA contract and is subject to the provisions of Section 305 of the National Aeronautics and Space Act of 1958, Public Law 85-568 (72 Stat. 435; 45 U.S.C. 2457).

BACKGROUND OF THE INVENTION

1. Field of the Invention

The field of art to which the invention pertains includes the field of adjustable securing bases, particularly with respect to a spaced array which can be adjustably positioned and locked to support a surface having a variable contour.

2. Description of the Prior Art

In U.S. patent application No. 721,150, filed Sept. 7, 1976 now U.S. Pat. No. 4,066,039 (NASA case number MSC-19666) there is described an adjustable securing base having a surface radius of curvature which can be adjusted to support an adjacent member on the base surface. The securing base comprises a flexible free plate with an adjustment mechanism connected on opposite edges of the base for adjusting the plates's curvature. An opening in the center of the plate is coupled to a vacuum source for securing the member adjacent to the plate's surface. It has been found that with such a securing device, and using a central source of air that the member being held would bend. In addition, the edges of the member, where there was only a minimum vacuum force present, would not be adequately held for further processing of the member. Moreover, the vacuum source which was greatest in the center would tend to bend the member at the central securing point. Moreover, where the member's surface was compound or variable the prior art securing systems were not satisfactory.

Known prior art includes U.S. Pat. Nos. 3,593,983; 2,203,572; 3,581,228; and 3,460,822.

The present invention utilizes a spaced array which can readily conform to the contour of the member having a variable surface and support the member along the entire surface. The member can then be duplicated while held in such operations as master/slave operation or in combination with a tracing machine to duplicate a surface contour.

SUMMARY OF THE INVENTION

A securing system for retaining a member along a surface having a variable contour. The system comprises a spaced array of adjustable spindles mounted on a housing having base member supporting cups at one end of the spindles. A vacuum source is coupled to the cups for seating the member adjacent to the cups. A locking mechanism sets the spindles in a predetermined position once the member is vacuum secured to the spindle cups.

The advantages of this invention, both as to its construction and mode of operation, will be readily appreciated as the same becomes better understood by reference to the following detailed description when considered in connection with the accompanying drawings in which like reference numerals designate like parts throughout the Figures.

DESCRIPTION OF PREFERRED EMBODIMENT

Figure 1:
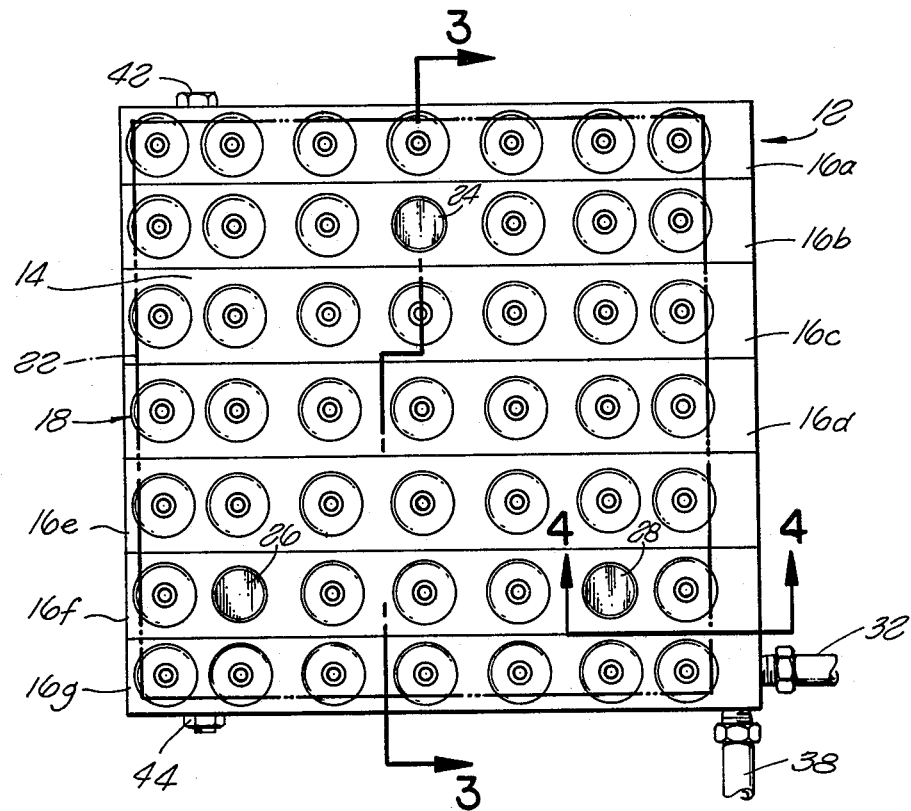
FIG. 1 is a top plan view of the variable contour securing system in accordance with the principles of the invention.

Referring now to the drawings there is shown in FIG. 1 a top plan view of the variable contour securing system constructed in accordance with principles of the invention. The securing system is formed of a housing 12 having a generally square top surface 14. The housing is formed of a plurality of rectangular shaped housing blocks 16(a-g) having a row of vacuum cups 18 extending upwardly from the top surface thereof and which are used to secure a member 22 whose bottom surface 23 contains a variable contour to the housing 12.

In the illustration shown each housing block contains a row of seven vacuum cups 18 with the exception of the second housing block 16b and the sixth housing block 16f. The second housing block 16b contains a hard point 24 in place of the central or fourth vacuum cup and the sixth housing block 16f contains a pair of hard points 26 and 28 in place of the respective vacuum cups which would normally be positioned next to the ends of the vacuum cups of the row. The hard points are not moveable in a vertical direction once they are adjusted to a predetermined height, and form a reference plane as will be explained in greater detail hereinafter.

A vacuum coupling inlet 32 is secured to a side of the housing 12 and it is used to introduce a vacuum source (not shown) to the securing system. The vacuum source is coupled to the bottom surface 23 of the member 22 through central passageways 34 in cylinders 36 which are positioned in the center of each of the vacuum cups 18. The vacuum path from the cylinder 36 will be described in greater detail hereinafter.

Once the vacuum source is actuated through the vacuum coupling, the member 22 is held adjacent the vacuum cups 18. The cylinders 36 are moveable along their axis and once the member 22 has been secured, the position of the cylinders 36 are locked by introducing a source of pressurized air into a locking inlet 38 coupled to the side of the housing 12. The operation of the locking mechanism of the cylinders will be described in greater detail hereinafter.

To secure each of the housing blocks 16 together to form the housing 12, a plurality of bolts 42 pass through the housing blocks in planes transverse to the rows of the vacuum cups and are secured at the end of the housing adjacent the outer surface of the housing block 16g by means of nuts 44.

Figure 2:
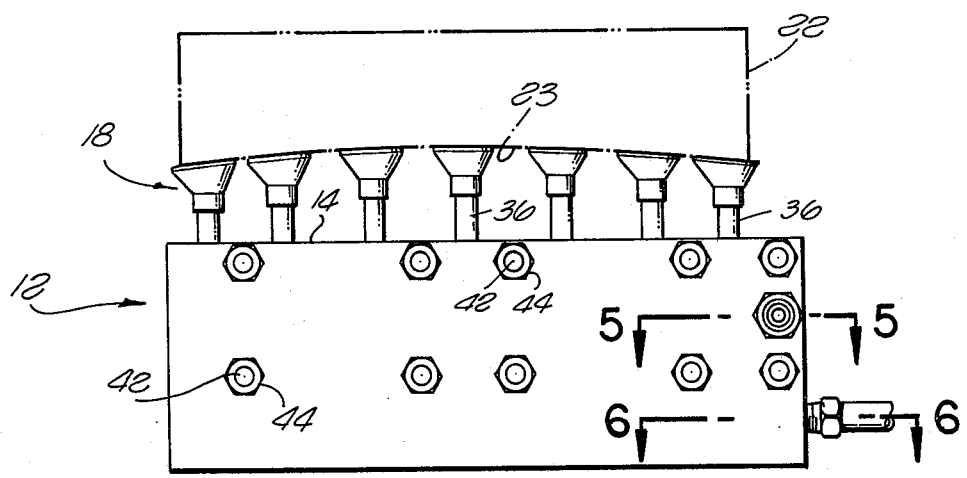
FIG. 2 is an end view of the securing system of FIG. 1.

As can be seen in FIG. 2 the member 22 bottom surface 23 is curved, so that the plurality of vacuum cups 18 abut the surface as the cylinders 36 rise varying distances from the top surface 14 of the housing 12.

Figure 3:
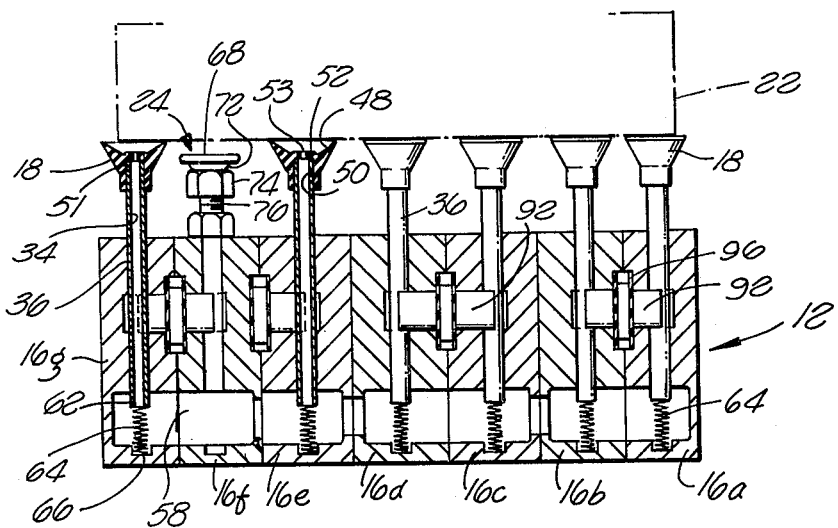
FIG. 3 is a cross-sectional view of the securing system taken along the line 3—3 of FIG. 1.

Referring now to FIG. 3 the interior construction of the securing system is shown in greater detail. Each of the vacuum cups 18 are formed of a flexible material, such as rubber, and have a central top recess 48 therein. A downwardly extending bore 50 of the cup 18 fits over the top end 51 of the cylinder 36. The bore 50 terminates at a flange 52 having a central opening 53 therein.

The cylinders 36 central passageway 34 enables the cup opening 53 to communicate with a lower vacuum cavity 58 formed in the lower portion of the housing blocks 16. With the housing blocks 16 connected together, the lower cavity 58 is in communication with all of the housing blocks comprising the housing 12.

Figure 6:
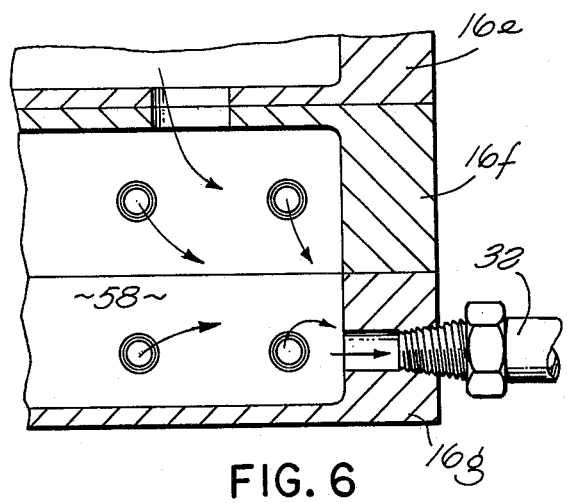
FIG. 6 is a partial cross-sectional view taken along the line 6—6 of FIG. 2.

The bottom end 62 of each of the cylinders 36 enter the cavity 58 and are biased upwardly by means of a spring 64 whose axis is aligned with the axis of the cylinders 36. Each of the springs 64 have their bottom end resting in a bore 66 formed in the lower wall of the housing cavity 58. When the vacuum source is introduced into the system through the vacuum coupling inlet 32 (FIG. 6), and a slight hand pressure applied to the top surface of the member 22, the member 22 is secured to the vacuum cups 18.

The hard points 24, 26 and 28 are formed of a generally flat top surface 68 of a swivable joint 72 connected to a head 74. The head 74 in turn is connected to an adjustable threaded member 76 enabling the hard point top surface 68 to be adjusted with respect to the housing top surface 14.

Once the vacuum source has been used to secure the member 22 to the vacuum cups (FIG. 3), further downward pressure is applied to the member 22 top surface until portions of the member 22 bottom surface rest against the hard point flat top surface 68 to form a stop index or reference. The cylinders 36 are then locked in place by means of the pressurized air source connected to the locking inlet 38.

Figure 5:
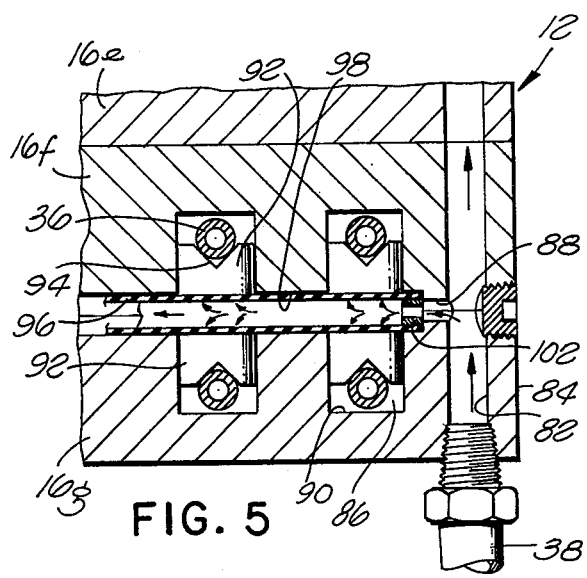
FIG. 5 is a partial cross-sectional view of the securing system taken along the line 5—5 of FIG. 2.

As can be seen in FIG. 5, the locking inlet 38 is coupled to a passageway 82 which is formed above the cavity 58 adjacent to the end wall 84 of the housing 12, and perpendicular to the housing blocks 16. Cavities 86 are cut in the housing blocks 16 from the side walls 88 thereof so that the cylinders 36 are spaced from the housing block surface 90 in the cavities 86.

The cavities 86 are formed above the vacuum chamber 58 and below the top surface 14 of the housing. Locking plugs 92 are slideably moveable in each of the cavities 86 and extend from adjacent the housing block side wall 88 to the cylinders 36 in the cavities 86. The locking plug 92 wall adjacent the housing block side wall 88 is generally parallel thereto. The other end of the locking plug 92 contains a generally V-shaped surface 94 which when forced against the cylinder 36 prevents movement of the cylinder 36 along its axis.

Figure 4:
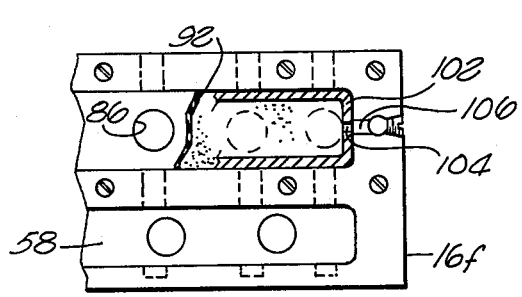
FIG. 4 is a partial cross-sectional view of the securing system taken along the line 4—4 of FIG. 1.

A rubber diaphragm 96 is formed in a recess 98 in the housing block side wall 88 and is generally juxtaposed with the end wall of the locking plugs 92 adjacent thereto. The diaphragms of adjacent housing blocks are positioned so that the adjacent surfaces can be held together by a bladder frame 102 and remain spaced apart. The bladder frame 102 (FIG. 4) in the housing block recess 102 perimeter is used for the additional purpose of interlocking and positioning adjacent blocks 16 together. Once the blocks 16 have been correctly positioned, they can be locked together by means of the nuts 44 and bolts 42.

An opening 104 in the bladder frame 102 end communicates with an intermediate passageway 106 which in turn is coupled to the main passageway 82. When air pressure (typically 80 P.S.I.) is introduced into the passageway 82 through the locking inlet 38, the diaphragm 96 exerts a force against the locking plugs 92 causing the cylinders 36 to remain in a fixed position. Simultaneously, the vacuum source retains the member 22 in a predetermined position. Additionally, it should be understood that the vacuum source used to secure the member 22 to the vacuum cups 18, and the pressure source used to lock the cylinders 36 in a predetermined position, can be used independently of each other.

While the system has been illustrated utilizing seven blocks 16, each having seven of the vacuum cups 18 or hard points, it should be understood that more or less blocks could be used with the number of cups or hard points varied as well. Further, the hard points could be eliminated if no reference plane was needed.

Further, the securing system can be used to machine substantially identical parts to a common desired thickness. The part to be machined is placed on the vacuum cups 18 and the vacuum source is activated. A force is then applied to the top surface of the part until the part bottom surface rests against the hard points top surface 68. The cylinders 36 are then locked in place by the air pressure source. After the part has been machined to a desired thickness, the part is released by removing the vacuum source, while retaining the cylinders 36 in their locked position. Then additional parts can be secured to the cups 18 by activating the vacuum source and the machining repeated.

Figure 7:
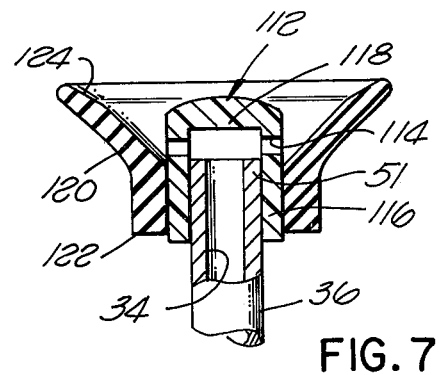
FIG. 7 is an alternative arrangement of construction of the vacuum cups shown in FIG. 3.

FIG. 7 illustrates an alternative arrangement for the vacuum cups 18 of FIG. 3. In FIG. 7, an inverted rigid plastic cup 112 is placed over the top end 51 of the cylinders 36. Openings 114 are formed in the side walls 116 of the inverted cup 112 intermediate the cup end wall 118, and the cylinder top end 51. The openings 114 then form a continuation of the cylinder passageway 34.

A flared rubber member 120 has a reduced diameter end 122 secured to the outer surface of the cup 112 below the openings 114. The member 120 flares upwardly to an upper annular surface 124 formed in a plane above the top surface of the cup end wall 118. The vacuum cups of FIG. 7 eliminate slight variations in positioning a member. The top surface of the inverted cup 112 forms a fixed reference plane as distinguished from the embodiment of FIG. 3 wherein the rubber vacuum cups 18 allow some slight variations in the positioning of a member against a wholly rubber cup. However, where brittle members are to be secured, the arrangement of FIG. 3 is preferable.

We claim:

1. A variable contour securing system including:
   means for retaining a member at a surface having a variable contour comprising a spaced array of adjustable spindles mounted on a housing base member having supporting cups at one end thereof;
   means for providing a vacuum source to said cups for seating said member adjacent to said cups; and
   reference spindles being provided which are fixedly secured to said housing base.

2. A variable contour securing system in accordance with claim 1 wherein said adjustable spindles are formed of hollow cylinders whose interior surface forms a path for air flow from said cups to said vacuum source.

3. A variable contour securing system in accordance with claim 2 wherein said adjustable spindles are vertically movable along the axis of said cylinders.

4. A variable contour securing system in accordance with claim 3 wherein said adjustable spindles are spring biased along the axis of said cylinders.

5. A variable contour securing system in accordance with claim 3 and further comprising locking means for setting said adjustable spindles in a predetermined position when said member is secured to said spindle cups.

6. A variable contour securing system in accordance with claim 5 wherein said locking means comprises a locking piston associated with said spindles and a flexible bladder adjacent to said locking piston, movement of said bladder causing a force to be applied to said locking pistons for retaining said spindles in said predetermined position.

7. A variable contour securing system including means for retaining a member at a surface having a varible contour comprising a spaced array of adjustable spindles mounted on a housing base member having supporting cups at one end thereof, said adjustable spindles being formed of hollow cylinders whose interior surface forms a path for air flow from said cups to said vacuum source, and said adjustable spindles being spring biased along the axis of said cylinders and vertically movable along the axis of said cylinders;

locking means for setting said adjustable spindles in a predetermined position when said member is secured to said spindle cups, said locking means comprising a locking piston associated with said spindles and a flexible bladder adjacent to said locking piston, movement of said bladder causing a force to be applied to said locking pistons for retaining said spindles in said predetermined position, and a source of air being provided for positioning said bladder adjacent said locking pistons.

* * * * *